(12) United States Patent
Schey

(10) Patent No.: US 10,170,930 B2
(45) Date of Patent: Jan. 1, 2019

(54) ELECTRICAL POWER RESTORATION SYSTEM FOR A CIRCUIT ASSEMBLY AND METHOD

(71) Applicant: Runway Energy, LLC, San Diego, CA (US)

(72) Inventor: Mark D. Schey, Denville, NJ (US)

(73) Assignee: Runway Energy, LLC, San Diego, CA (US)

( * ) Notice: Subject to any disclaimer, the term of this patent is extended or adjusted under 35 U.S.C. 154(b) by 223 days.

(21) Appl. No.: 15/390,337

(22) Filed: Dec. 23, 2016

(65) Prior Publication Data

US 2017/0187235 A1    Jun. 29, 2017

Related U.S. Application Data

(60) Provisional application No. 62/271,553, filed on Dec. 28, 2015.

(51) Int. Cl.
*H02J 9/06* (2006.01)
*H02J 7/00* (2006.01)
*H02M 7/44* (2006.01)

(52) U.S. Cl.
CPC ............ *H02J 9/061* (2013.01); *H02J 7/0068* (2013.01); *H02J 9/062* (2013.01); *H02M 7/44* (2013.01)

(58) Field of Classification Search
CPC .......... H02J 9/061; H02J 9/062; H02J 7/0068; H02M 7/44
See application file for complete search history.

(56) References Cited

U.S. PATENT DOCUMENTS

| 4,412,170 A | 10/1983 | Roesel, Jr. |
| 4,890,005 A | 12/1989 | Schornack |

(Continued)

FOREIGN PATENT DOCUMENTS

| CN | 203387410 U | * | 1/2014 |
| CN | 203387410 U |   | 1/2014 |

OTHER PUBLICATIONS

International Search Report and Written Opinion, Serial No. PCT/US16/68576, dated Mar. 17, 2017.

*Primary Examiner* — Jared Fureman
*Assistant Examiner* — Michael Warmflash
(74) *Attorney, Agent, or Firm* — Roeder & Broder LLP; James P. Broder

(57) ABSTRACT

An electrical power restoration system for a circuit assembly having a circuit breaker, an electrical load and a circuit conditioner (e.g., a UPS) includes a circuit controller that is positioned along the circuit assembly between the circuit breaker and the electrical load. The circuit controller is electrically connected to the circuit conditioner, and controls activation and/or deactivation of the circuit conditioner. The circuit conditioner is positioned along the circuit assembly between the circuit controller and the electrical load and provides alternative AC power to the electrical load as determined by the circuit controller. The electrical power restoration assembly includes a first hot conductor and a second hot conductor. The first hot conductor conducts AC power from the circuit breaker to the circuit controller. The second hot conductor conducts AC power or alternative AC power from the circuit controller to the electrical load as determined by the circuit controller.

21 Claims, 4 Drawing Sheets

(56) References Cited

U.S. PATENT DOCUMENTS

| | | | |
|---|---|---|---|
| 5,138,184 A * | 8/1992 | Keefe | H02J 9/06 |
| | | | 307/127 |
| 5,666,256 A * | 9/1997 | Zavis | G05F 1/14 |
| | | | 361/115 |
| 5,880,537 A | 3/1999 | Windhorn | |
| 6,191,500 B1 * | 2/2001 | Toy | H02J 3/46 |
| | | | 307/64 |
| 7,047,431 B2 | 5/2006 | Suzuki | |
| 7,333,316 B1 | 2/2008 | Norris | |
| 7,514,815 B2 | 4/2009 | Paik et al. | |
| 8,193,662 B1 | 6/2012 | Carlson et al. | |
| 8,994,276 B2 | 3/2015 | Recker et al. | |
| 2008/0144238 A1 * | 6/2008 | Cline | A61H 33/005 |
| | | | 361/42 |
| 2013/0113453 A1 * | 5/2013 | Shilling | H05B 33/0815 |
| | | | 323/311 |

\* cited by examiner

ELECTRICAL POWER RESTORATION SYSTEM FOR A CIRCUIT ASSEMBLY AND METHOD

BACKGROUND

Today's residential alternating current (AC) power requirements are relatively complex. All too often, the supply of power does not keep up with the demand for the power. This disparity can result in brown-outs, black-outs, or more locally, partial power outages within areas of a single home. A standard uninterruptible power supply (UPS) can provide limited assistance by at least supplying direct current (DC) power through an inverter to produce an alternative AC power source for a finite period of time to protect critical electrical loads such as computers and other telecommunication equipment during an AC power outage. Unfortunately, while these important devices can remain running, other key electrical loads are often ignored by the operation of the UPS, such as interior lighting, electrical outlets, as well as televisions and other relatively low load electrical devices.

SUMMARY

The present invention is directed toward an electrical power restoration system for a circuit assembly. The circuit assembly includes a circuit breaker, an electrical load and a circuit conditioner. The circuit conditioner is configured to condition electrical current flowing through the circuit assembly. In certain embodiments, the electrical power restoration system includes a circuit controller that is positioned along the circuit assembly between the circuit breaker and the electrical load. In various embodiments, the circuit controller is electrically connected to the circuit conditioner. The circuit controller can selectively control activation and/or deactivation of the circuit conditioner.

In certain embodiments, the circuit conditioner is positioned along the circuit assembly between the circuit controller and the electrical load.

In some embodiments, the circuit conditioner includes an uninterruptible power supply that selectively provides an alternative AC power to the electrical load.

In various embodiments, the electrical power restoration assembly can also include a first hot conductor and a second hot conductor. The first hot conductor selectively conducts AC power from the circuit breaker to the circuit controller. In one embodiment, the second hot conductor conducts AC power from the circuit controller to the electrical load only when the first hot conductor conducts AC power from the circuit breaker to the circuit controller. In another embodiment, the second hot conductor conducts alternative AC power from the circuit controller to the electrical load only when the first hot conductor does not conduct AC power from the circuit breaker to the circuit controller.

In certain embodiments, the alternative AC power is provided by the circuit conditioner.

In certain embodiments, the circuit controller selectively powers the circuit conditioner via the first hot conductor.

In some embodiments, at least a portion of the first hot conductor and a portion of the second hot conductor are each included as part of one at least partially sheathed, insulated electrical cable.

In various embodiments, the first hot conductor and the second hot conductor are electrically isolated from one another.

In certain applications, the circuit controller includes a central processing unit having a memory storage that stores usage data of at least a portion of the electrical power restoration system.

In some embodiments, the electrical power restoration assembly can also include a low-voltage component. Further, the circuit controller can include a transformer for transforming 120V AC power to approximately 5V DC power to power the low-voltage component.

In various embodiments, the circuit controller includes a current usage monitor that monitors a current passing along one of the first hot conductor and the second hot conductor.

The present invention is also directed toward a method for restoring electrical power to an electrical load. In some embodiments, the method includes the steps of positioning a circuit controller along a circuit assembly between a circuit breaker and the electrical load, electrically connecting the circuit controller to a circuit conditioner that is configured to selectively condition electrical current flowing through the circuit assembly, and controlling activation of the circuit conditioner with the circuit controller.

BRIEF DESCRIPTION OF THE DRAWINGS

The novel features of this invention, as well as the invention itself, both as to its structure and its operation, will be best understood from the accompanying drawing, taken in conjunction with the accompanying description, in which similar reference characters refer to similar parts, and in which.

DESCRIPTION

Embodiments of the present invention are described herein in the context of an electrical power restoration system. Those of ordinary skill in the art will realize that the following detailed description of the monitoring system is illustrative only and is not intended to be in any way limiting. Other embodiments of the monitoring system will readily suggest themselves to such skilled persons having the benefit of this disclosure. Reference will now be made in detail to implementations of the electrical power restoration system as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
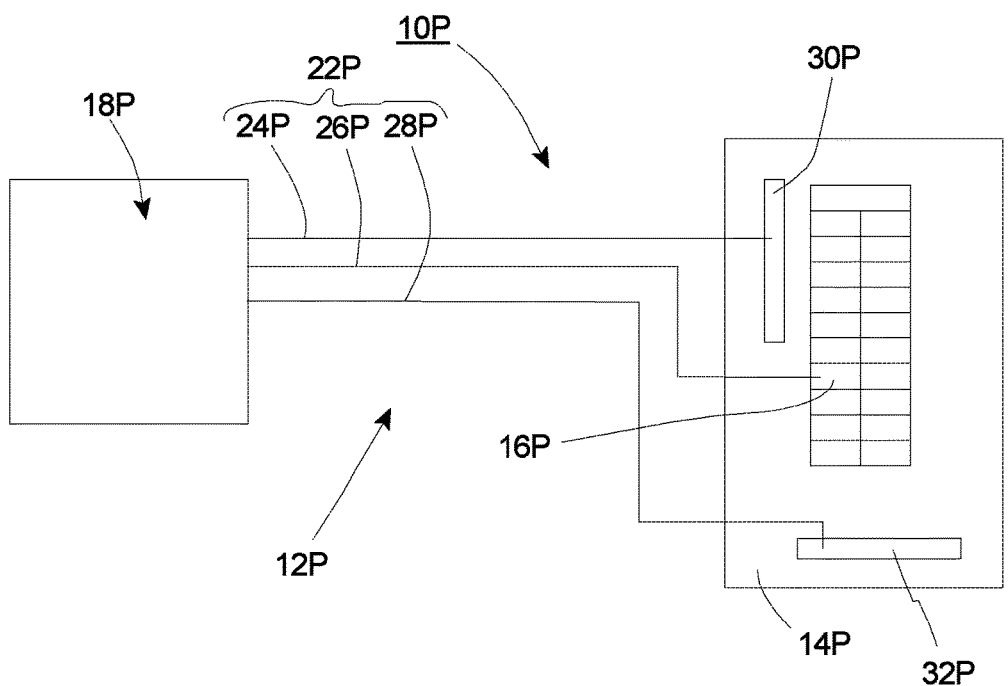
FIG. 1 is a schematic illustration of a portion of a prior art electrical assembly including a circuit assembly.

FIG. 1 is a schematic illustration of a portion of a prior art electrical assembly 10P. The prior art electrical assembly 10P includes a conventional circuit assembly 12P. It is understood that although only one circuit assembly 12P is shown and described in detail herein for ease of discussion, the prior art electrical assembly 10P can include any suitable number of conventional circuit assemblies 12P. The electrical assembly 10P receives an electrical power feed (not shown) from an outside source (not shown), and distributes electrical current from the electrical power feed within and/or around a building, another structure or an area in a controlled manner. As illustrated in FIG. 1, the prior art electrical assembly 10P can also include an electrical panel 14P having a plurality of circuit breakers 16P (only one circuit breaker 16P is labeled in FIG. 1). For a circuit assembly 12P that utilizes a typical 15A or 20A single pole circuit breaker 16P, electrical current is distributed directly to an electrical load 18P which can include one or more of lighting, electrical outlets, garage doors, televisions, and the like. As used herein, the term "directly" is intended to mean that the electrical current does not pass through other structures that may significantly alter the electrical current between the electrical panel 14P and the electrical load 18P, or change a condition of the electrical current between the electrical panel 14P and the electrical load 18P.

The prior art circuit assembly 12P includes a wiring assembly 22P that provides a direct conductive path for electrical current between the electrical panel 14P and the electrical load 18P. The prior art wiring assembly 22P that utilizes a 15A or 20A single pole circuit breaker 16P includes a neutral conductor 24P, a hot conductor 26P and a ground conductor 28P. Each of these conductors 24P, 26P, 28P, extends directly between the electrical panel 14P and the electrical load 18P. The neutral conductor 24P is connected to the electrical panel 14P at a neutral bus bar 30P. The hot conductor 26P is connected to the electrical panel 14P at the circuit breaker 16P. The ground conductor 28P is connected to the electrical panel 14P at a ground bus bar 32P. Although shown separately in FIG. 1, the three conductors 24P, 26P, 28P, are normally wrapped together in an insulated sheath (such as with 12-2 or 14-2 Romex® cabling, for example) at least partially between the electrical panel 14P and the electrical load 18P. As used throughout this disclosure, a "hot conductor" is any conductor (wire or otherwise) connected with an electrical system that has electric potential relative to electrical ground or neutral, and a "neutral conductor" is a return conductor in the circuit assembly.

Typically, current flows from the electrical panel 14P to the electrical load 18P via the hot conductor 26P, and returns via the neutral conductor 24P. In a grounded system, metal structures such as appliances and metal boxes connect back to the ground bus bar 32P of the electrical panel 14P. From there, the electrical assembly 10P can be grounded to the earth via buried ground rods (not shown).

Figure 2:
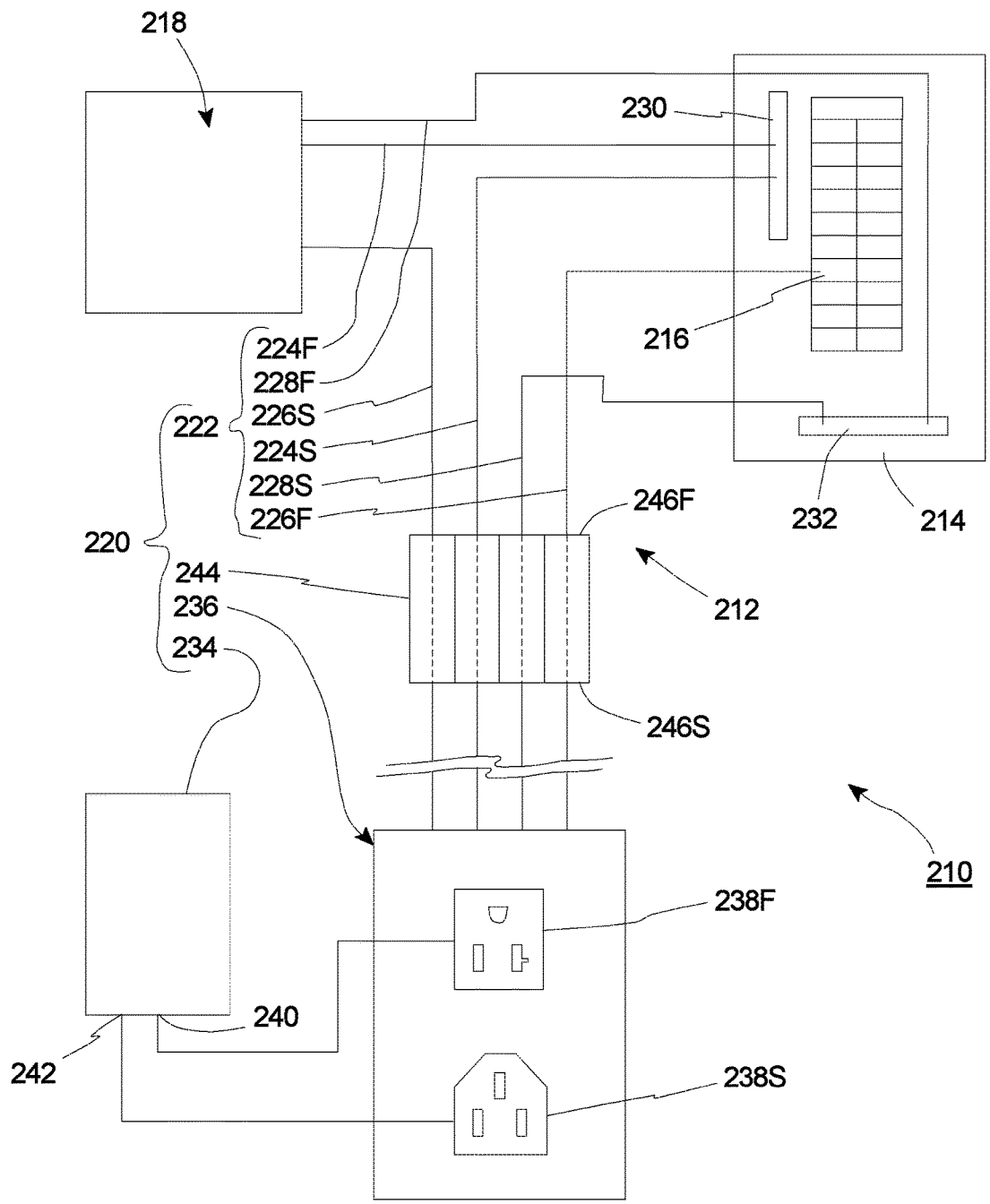
FIG. 2 is a simplified schematic illustration of one embodiment of a portion of an electrical assembly including a circuit assembly with an electrical power restoration system having features of the present invention, the electrical power restoration system including a circuit controller.

FIG. 2 is a simplified schematic illustration of one embodiment of a portion of an electrical assembly 210 having features of the present invention. In this embodiment, the electrical assembly 210 includes a circuit assembly 212. It is understood that although only one complete circuit assembly 212 is shown and described in detail herein for ease of discussion, the electrical assembly 210 can include any suitable number of circuit assemblies 212 which may or may not have one or more features or components of the circuit assembly 212 shown and described herein. The electrical assembly 210 receives an electrical power feed (not shown) from an outside source (not shown), and distributes AC power from the electrical power feed within and/or around a building, another structure or an area in a controlled manner. The specific design of the electrical assembly 210 can vary. In various embodiments, the electrical assembly 210 can also include an electrical panel 214 having a plurality of circuit breakers 216 (only one circuit breaker 216 is labeled in FIG. 2). The electrical panel 214 can be substantially similar to the prior art electrical panel 14P illustrated in FIG. 1.

The circuit assembly 212 alternately and selectively distributes AC power or an alternative AC power to specific structures within and/or around the building or other structure. As used herein, AC power comes from a power source that feeds the electrical panel 214. In contrast, alternative AC power comes from a different source (such as a uninterruptible power supply (UPS), as one non-exclusive example), as provided in greater detail below.

The specific design of the circuit assembly 212 can be varied depending upon the requirements of the electrical assembly 210. In the embodiment illustrated in FIG. 2, the circuit assembly 212 can include one of the circuit breakers 216, one or more electrical loads 218 (represented by a rectangle), and an electrical power restoration system 220.

The circuit breaker 216 can be an electrical switch that protects the rest of the circuit assembly 212 from damage caused by events such as overcurrent, overload or a short circuit. The circuit breaker 216 interrupts the flow of current through the circuit assembly 212 upon detection of one of these events. The design of the circuit breaker 216 can vary. In certain embodiments, the circuit breaker 216 for the circuit assembly 212 can be a 15A or a 20A circuit breaker. Alternatively, the circuit breaker 216 for the circuit assembly 212 can include another suitable amperage circuit breaker.

The electrical loads 218 included in the circuit assembly 212 can be substantially similar to the prior art electrical load 18P illustrated and described with respect to FIG. 1. For example, the electrical load 218 can include various electrical fixtures such as lighting, electrical outlets, garage door openers, televisions and other relatively low load electrical devices, as non-exclusive examples. As provided herein, electrical current is guided to the electrical load 218 within the circuit assembly 212.

The electrical power restoration system 220 selectively conditions the flow of current from the electrical panel 214 to the electrical load 218 within the circuit assembly 212. The specific design of the electrical power restoration system 220 can vary depending upon the electrical requirements of the circuit assembly 212 and/or the electrical assembly 210. In the embodiment illustrated in FIG. 2, the electrical power restoration system 220 can include one or more of a wiring assembly 222, a circuit conditioner 234 and a circuit controller 236.

The wiring assembly 222 provides an indirect conductive path for electrical current between the circuit breaker 216 of the electrical panel 214 and the electrical load 218. In other words, rather than the wiring assembly 222 directly and uninterruptedly connecting the circuit breaker 216 to the electrical load 218, at least one other structure is positioned between the circuit breaker 216 to the electrical load 218.

In the embodiment illustrated in FIG. 2, the wiring assembly 222 that utilizes a 15A or 20A single pole circuit breaker 216 includes a first neutral conductor 224F, a second neutral conductor 224S, a first hot conductor 226F, a second hot conductor 226S, a first ground conductor 228F and a second ground conductor 228S. The first neutral conductor 224F is connected to the electrical panel 214 at a neutral bus bar 230, and extends to the electrical load 218. The second neutral conductor 224S in connected to the electrical panel 214 at the neutral bus bar 230, and extends to the circuit controller 236. The first hot conductor 226F is connected to the electrical panel 214 at the circuit breaker 216, and extends to the circuit controller 236. The second hot conductor 226S extends from the circuit controller 236 to the electrical load 218. The first ground conductor 228F is connected to the electrical panel 214 at a ground bus bar 232, and extends to the electrical load 218. The second ground conductor 228S is connected to the electrical panel 214 at the ground bus bar 232, and extends to the circuit controller 236. In other words, the electrical power restoration system 220 is positioned between one of the circuit breakers 216 of the electrical panel 214 and the electrical load 218. With this design, each electrical power restoration system 220 can specifically impact, affect or otherwise influence an entire electrical load 218 of one circuit assembly 212, without affecting any other circuit assemblies 212 in the electrical assembly 210.

The circuit conditioner 234 selectively conditions the circuit assembly 212 between the circuit breaker 216 of the circuit assembly 212 and the particular electrical load 218 that is serviced within the circuit assembly 212. The specific device used for the circuit conditioner 234 can vary depending upon the design requirements of the circuit assembly 212 and the electrical power restoration system 220. In one embodiment, the circuit conditioner 234 can include an uninterruptible power supply (UPS) that generates DC power that flows through an inverter to become the alternative AC power.

In non-exclusive alternative embodiments, the circuit conditioner 234 can be a line (conductor) conditioner, a surge protector, a voltage regulator, a noise filter, or a pass-through. Still alternatively, the circuit conditioner 234 can include any other suitable device that conditions the circuit assembly 212 between one of the circuit breakers 216 of the electrical panel 214 and the particular electrical load 218 that is serviced within the circuit assembly 212. Although the description herein focuses specifically on a UPS as the circuit conditioner 234, it is understood that any suitable device can equally be utilized in the electrical power restoration system 220 described herein.

The circuit controller 236 selectively controls activation and/or deactivation of the circuit conditioner 234 on the circuit assembly 212. In various embodiments, the circuit controller 236 can selectively activate and/or deactivate the circuit conditioner 234 upon the occurrence of certain events that are monitored by the circuit controller 236, as described in greater detail below. The design of the circuit controller 236 can vary depending upon the specific requirements of the circuit assembly 212 and/or the circuit assembly 210.

In certain embodiments, the circuit controller 236 can sense changes in current and/or voltage through the first hot conductor 226F, and can control the status of the circuit conditioner 234. For example, if changes in the current and/or voltage are detected by the circuit controller 236, the circuit conditioner 234 can be activated or deactivated, as needed. More specifically, in one embodiment, if the current and/or voltage is determined by the circuit controller 236 to have dropped below a predetermined threshold, the circuit controller 236 can activate the circuit conditioner 234 so that the alternative AC power from the UPS is sent to the electrical load 218 through the circuit controller 236 via the second hot conductor 226S. Then, once the current and/or voltage is determined by the circuit controller 236 to have risen above a predetermined threshold, the circuit controller 236 can deactivate the circuit conditioner 234 so that the alternative AC power from the UPS discontinues, and AC power from the circuit controller 236 (via the electrical panel 214) is restored and sent to the electrical load 218 via the second hot conductor 226S. In embodiments in which the circuit conditioner 234 is a device other than a UPS, other corresponding effects to the circuit assembly 212 and/or the electrical load 218 can occur accordingly, i.e. regulation of voltage, surge protection, etc.

In general terms, the circuit assembly 212 provided herein can take a first hot conductor 226F from an output of the circuit breaker 216, monitor the current with the circuit controller 236, modify the current as needed and/or provide the alternative AC energy source as an instant backup (such as a DC battery backup which generates the alternative AC power, in one embodiment), then send it back to the power the electrical load 218.

In the embodiment illustrated in FIG. 2, the circuit conditioner 234 can be electrically connected to the circuit controller 236. In one non-exclusive embodiment, the circuit controller 236 can include one or more controller connectors. For example, in the embodiment illustrated in FIG. 2, the circuit controller 236 includes a first controller connector 238F and a second controller connector 238S. In this embodiment, these controller connectors 238F, 238S can include various types of electrical connectors, i.e. a female NEMA receptacle such as a NEMA 520R, as one non-exclusive example, and a recessed male plug such as an IEC C20 Plug, as one non-exclusive example, as illustrated in FIG. 2. Alternatively, any suitable electrical connector(s) can be used. Still alternatively, the circuit conditioner 234 can be hard-wired to the circuit controller so that receptacles and/or plugs are not necessary.

In this embodiment, the first controller connector 238F can be backwards compatible with a standard household 15A plug (such as on a consumer UPS) so that a conditioner input 240 of the circuit conditioner 234 can be plugged into the first controller connector 238F to receive electrical power from the first hot conductor 226F. In other words, the first controller connector 238F can provide power to the circuit conditioner 234 via the first hot conductor 226F. Further, the second controller connector 238S can be connected to a conditioner output 242 of the circuit conditioner 234 using an appropriate cable. In one embodiment, the circuit controller 236 can have a form factor of, or fit within (or include) a 1-gang or 2-gang deep electrical box, e.g. a standard junction box. Alternatively, the circuit controller 236 can have another suitable form factor.

In the embodiment illustrated in FIG. 2, the electrical power restoration system 220 can also include a connector assembly 244. The connector assembly 244 can receive one or more of the second neutral conductor 224S, the second ground conductor 228S, the first hot conductor 226F and/or the second hot conductor 226S. In one embodiment, the connector assembly 244 receives all four of these conductors 224S, 226F, 226S, 228S, into a first end 246F of the connector assembly 244. In one such embodiment, the wiring assembly 222 extends from a second end 246S of the connector assembly 244 and connects to the circuit controller 236. The connector assembly 244 can act as a compact splice or push connector to extend the length of the conductors 224S, 226F, 226S, 228S, so that these conductors can connect to the circuit controller 236. The positioning of the connector assembly 244 can be varied. In one embodiment, the connector assembly 244 can be positioned within or near the electrical panel 214. Alternatively, the connector assembly 244 can be positioned remotely from the electrical panel 214.

In one embodiment, a portion of the wiring assembly 222 that is positioned between the connector assembly 244 and the circuit controller 236 can include a sheathed, insulated section of Romex® cable, such as a 12-3 or 14-3 cable, as non-exclusive examples. Alternatively, this portion of the wiring assembly 222 need not be sheathed and/or insulated.

Figure 3:
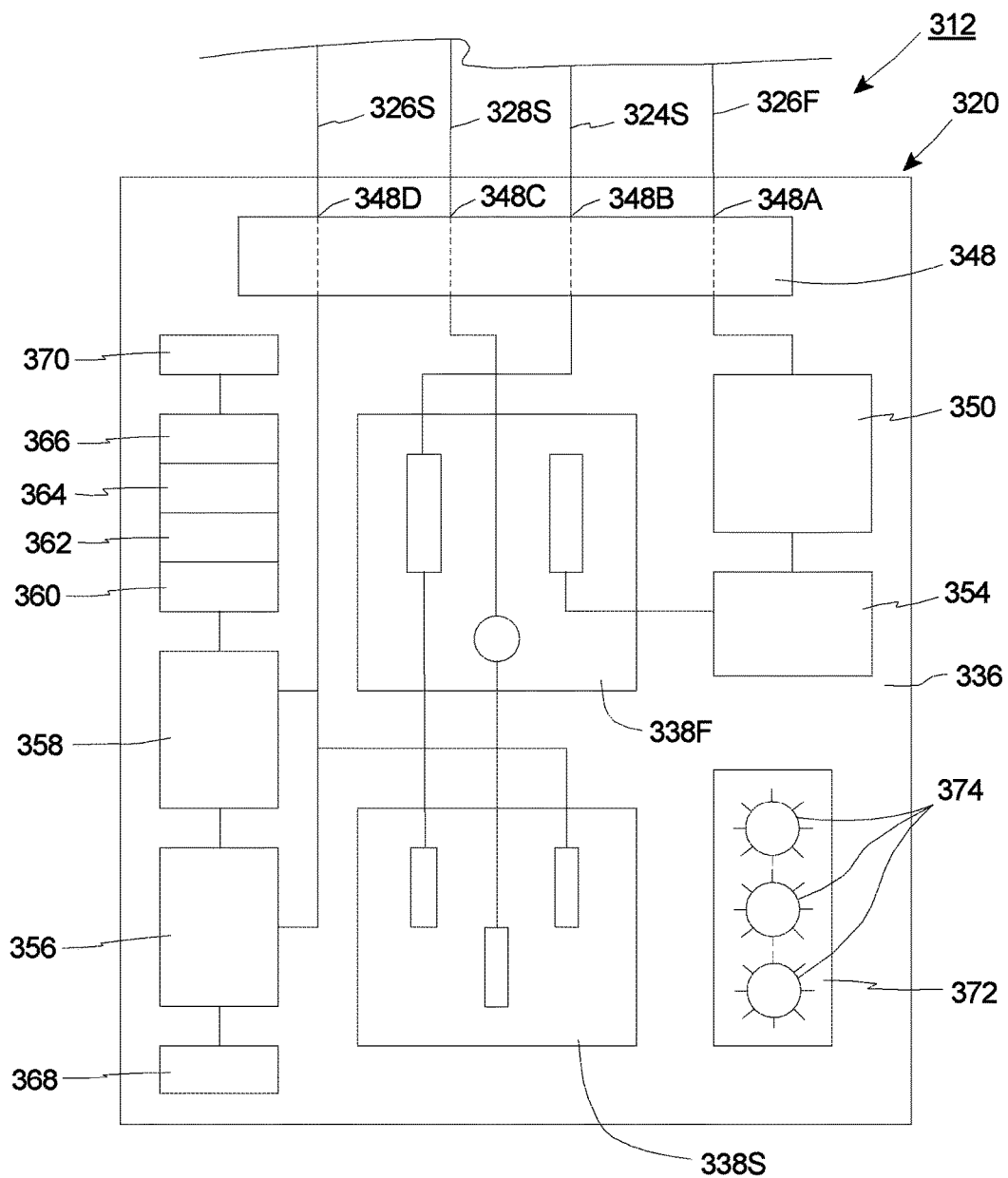
FIG. 3 is a detailed schematic illustration of one embodiment a portion of the circuit assembly including the electrical power restoration system having the circuit controller.

FIG. 3 is a detailed schematic illustration of one embodiment of a portion of a circuit assembly 312, including a portion of an electrical power restoration system 320. In this embodiment, the electrical power restoration system 320 includes a wiring assembly 322, a circuit conditioner 234 (illustrated in FIG. 2) and a circuit controller 336. In the embodiment illustrated in FIG. 3, a portion of the wiring assembly 322 and the circuit conditioner 234 have been omitted in order to focus on various features of the circuit controller 336. It is recognized that the wiring assembly 322 (only partially illustrated in FIG. 3) can be substantially similar to the wiring assembly 222 illustrated in FIG. 2. Further, the circuit conditioner 234, although not illustrated in FIG. 3, is included in the electrical power restoration system 320.

In this embodiment, the circuit controller 336 can control and perform various functions that pertain to monitoring certain aspects of the circuit assembly 312. The specific components of the circuit controller 336 can vary to suit the design requirements of the circuit assembly 312. In the embodiment illustrated in FIG. 3, the circuit controller 336 includes a controller connector 348, a first current/voltage sensor 350, one or more relays 354, a transformer 356, a second current/voltage sensor 358, a central processing unit 360 (CPU), a capacitor 362, a replaceable battery 364, a memory storage 366, a temperature sensor 368, a USB port 370, and/or an indicator 372. It is understood that the circuit controller 336 need not include all of the foregoing structures, as one or more of these structures can be omitted in certain embodiments. Further, it is understood that the circuit controller 336 can include additional structures not described herein in some embodiments. Further, one or more printed circuit boards (not shown) can house and/or support one or more of the components of the circuit controller 336.

The controller connector 348 facilitates connection of the first hot conductor 326F, the second hot conductor 326S, the second neutral conductor 324S and the second ground conductor 328S to internal wiring and/or circuitry of the circuit controller 336, and to the first controller connector 338F and the second controller connector 338S. The controller connector 348 can act as a compact splice or push connector to connect these conductors 324S, 326F, 326S, 328S, to the circuit controller 336. In the embodiment illustrated in FIG. 3, the first hot conductor 326F is connected to a first hot connector 348A of the controller connector 348; the second neutral conductor 324S is connected to the second neutral connector 348B; the second ground conductor 328S is connected to the second ground connector 348C; and the second hot conductor 326S is connected to the second hot connector 348D.

Internal wiring within the circuit controller 336 permits these connections to result in certain functions of the circuit controller 336. For example, during AC power usage, the first hot conductor 326F powers the circuit controller 336 and charges the circuit conditioner 234 via the first controller connector 338F. Also during AC power usage, the first hot conductor 326F powers the electrical load 218 (illustrated in FIG. 2) via the second hot conductor 326S. During alternative AC power usage, no current flows through the first hot conductor 326F to the first controller connector 338F. However during alternative AC power usage, the circuit conditioner 234 can provide the alternative AC power to the electrical load 218 via the second hot conductor 326S since the circuit conditioner 234 is plugged into the second controller connector 338S.

The first current/voltage sensor 350 detects the current and/or voltage of the first hot conductor 326F. The first current/voltage sensor 350 can report the current and/or voltage in real-time to the CPU 360 on a periodic basis that can be determined by a user of the system. In one embodiment, the first current/voltage sensor 350 can be a Hall Effect sensor. In certain embodiments, the first current/voltage sensor 350 can be positioned at a fixed (known) distance from the first hot conductor 326F in order to increase accuracy of the first current/voltage sensor 350. Further, the first current/voltage sensor 350 can also trigger an alert in real-time if the first hot conductor 326F input significantly drops or drops to zero, indicating power has been lost, either by the circuit breaker 216 (illustrated in FIG. 2) tripping or utility power shutting off, or some other power interruption to the circuit assembly 312.

The relay 354 (such as a 120V AC solid state relay, for example) is an electronic switching device that switches on or off when an external voltage is applied. The relay 354 can allow various modes of operation of the electrical power restoration system 320. The relay 354 can include a sensor which responds to an appropriate input (control signal), an electronic switching device which switches power to the load circuitry, and a coupling mechanism to enable the control signal to activate this switch. In one embodiment, if sufficient AC power is being received through the first hot conductor 326F, the relay 354 can cause AC power to flow directly through to the second hot conductor 326S, bypassing the circuit conditioner 234. This will allow high wattage devices, such as a vacuum cleaner, to function normally. Optionally, the first current/voltage sensor 350 can trigger the relay 354, e.g. if power is greater than a predetermined wattage or the rating of the UPS, to cause AC power to flow directly through to the second hot conductor 326S, bypassing the circuit conditioner 234, and return to UPS mode once the power sufficiently decreases. In this "Smart Mode", the combination of the first current/voltage sensor 350 and the relay 354 will allow the circuit assembly 312 to work as normal, independent of the UPS capabilities. However, this combination can offer the maximum UPS capability in a power fail mode. The user can also activate an "Alternative AC Power Only Mode", however, the UPS may enter an error mode if a high watt appliance is activated. Finally, the user can activate an "AC Power Only Mode" which forces the system to stay on AC power and only switch to the alternative AC power at the instant a power failure is detected.

In one embodiment, the transformer 356 can transform 120V AC to approximately 5V DC (or any other suitable DC voltage which may be less than or greater than 5V), taking power from the second hot conductor 326S and powering one or more low-voltage components within the circuit controller 336, such as the indicator 372 (as one non-exclusive example), or other low-voltage structures.

The second current/voltage sensor 358 monitors the current and/or voltage passing along the second hot conductor 326S. In one embodiment, the second current/voltage sensor 358 can be a Hall Effect sensor. In certain embodiments, the second current/voltage sensor 358 can be positioned at a fixed (known) distance from the second hot conductor 326S in order to increase accuracy of the first current/voltage sensor 358. The second current/voltage sensor 358 can then report a real-time load to the CPU 360 for data storage and/or indication of a malfunction (current and/or voltage is too low or too high).

The central processing unit 360 receives data from various structures within the circuit controller 336. Further, in one embodiment, the data from the CPU 360 can be accessed by a user remotely, such as on a computing device (smart phone, tablet, desktop, laptop, etc.) via Wi-Fi or other wireless technology known to those skilled in the art, or using a wired system.

The CPU 360 can also include other components, such as a particle.io "Photon" (www.particle.io/prototype) for the development phase, and a "P0" or "P1" for the initial run, which can include one or more of:
  a. STM32F205 ARM Cortex M3 Processor;
  b. Programmable Broadcom BCM43362 Wi-Fi Chip;
  c. Preloaded firmware libraries;
  d. FCC/CE/IC certified; and/or
  e. Complete "fleet management" with cloud based data collection and firmware updates.

The capacitor 362 can inhibit the likelihood of a reboot of the CPU 360 during the very brief time period between a power loss and the UPS 234 turning on. Additionally, or in the alternative, the replaceable battery 364 can be used for this purpose.

In one embodiment, the memory storage 366 can include Flash memory. Alternatively, any other suitable type of memory storage 366 can be used. The memory storage 366 can be sufficient enough to store at least approximately seven days of usage data internally (in the event of an Internet failure) at increments of approximately five minutes. This equates to approximately 288 data points per day, for a total of approximately 2000 data points over a seven day period. These data points can automatically synchronize with the internet cloud upon reconnection. This memory storage 366 can also have enough storage space for periodic, e.g. hourly usage data (24 data points a day) for the previous six months, or approximately 4000 entries. A total of 6000 data points can be stored internally by the memory storage 366 of the circuit controller 336. This stored data can be sent via Wi-Fi (or other suitable manners) to the cloud and/or any other internet-connected device.

The temperature sensor 368 can also be used for safety to monitor the circuit controller 336 and its components. In the event the temperature of the circuit controller 336, or any component of the circuit controller 336 is beyond a predetermined threshold temperature, a signal can be transmitted to the CPU 360. The CPU can then alter the management of the AC power or alternative AC power being used accordingly.

The USB port 370 can be used to upload data from the CPU 360 or the memory storage 366 to a computing device (not shown). Additionally, or in the alternative, the USB port 370 can be used to access the circuit controller 336 in order to change settings or force a certain mode, i.e. AC Power Only Mode, Smart Mode, Alternative AC Power Only Mode, etc.

The indicator 372 can include one or more lights 374 (three lights 374 are illustrated in the indicator 372) visually alert the user regarding operation of the circuit assembly 312. The lights 374 can be LED lights, or any other suitable type of light. For example, a red LED can indicate that power is out. A green LED can indicate that the circuit controller 336 is ready and is connected to Wi-Fi. A brighter green pulsing LED can indicate that Wi-Fi data has been sent. A blue LED can indicate that firmware of the circuit controller 336 is updating. A yellow flash can indicate a voltage spike. In other words, various colors or flashing could provide a visual indicator of errors or data. It is appreciated that these are just representative of numerous possibilities and color combinations, and the foregoing examples are not intended to be limiting in any manner. The circuit controller 336 can also include audible alerts (not shown) as needed.

In certain embodiments, the user of the electrical power restoration system 320 can input information into the circuit controller 336 in order to alter operation of the electrical circuit 312. For example, if the user wants the electrical load 218 to be powered by alternative AC power, the user can send this command to the circuit controller 336 wirelessly or via the USB port 370. In addition, or in the alternative, the user can specify that the electrical load 218 is to be powered by AC power if the electrical circuit 312 requires above a certain wattage (e.g. 1000 watts), and alternative AC power if the electrical circuit 312 requires below a certain wattage (e.g. 1000 watts). It is understood that there are numerous ways for the user to customize the electrical power restoration system 320, and the foregoing examples are provided as non-exclusive examples of the versatility of the electrical power restoration system 320.

Figure 4:
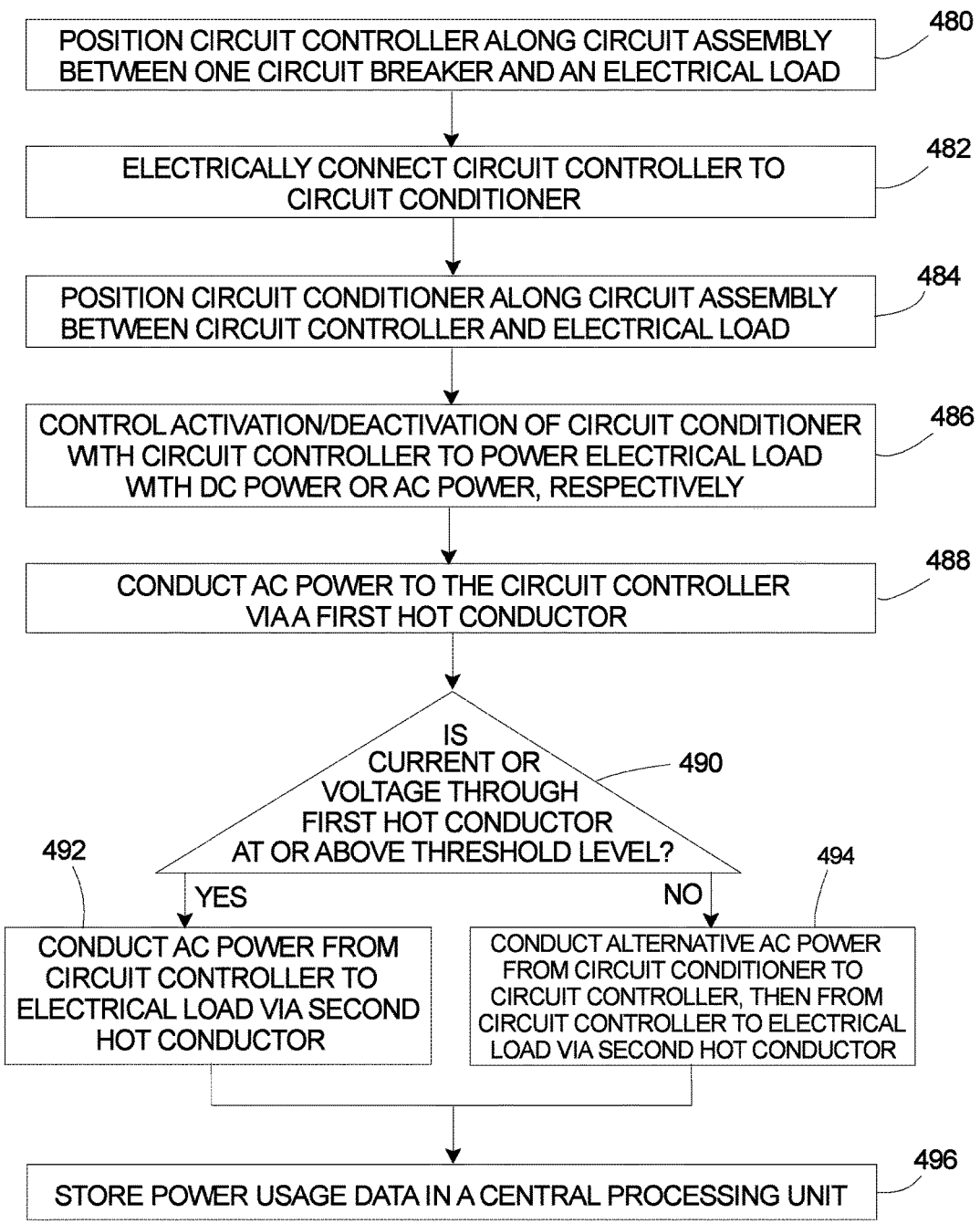
FIG. 4 is a flow chart showing one embodiment of a method for restoring electrical power to an electrical load in a circuit assembly.

FIG. 4 is a flow chart that provides various steps of one embodiment of a method for restoring electrical power to an electrical load. It is understood that the method described in FIG. 4 is representative of one embodiment of the method, and that alternative embodiments may omit one or more of the described steps. Further, in certain embodiments, other steps can be added that are not described in FIG. 4.

At step 480, a circuit controller is positioned along a circuit assembly between one circuit breaker and the electrical load.

At step 482, the circuit controller is electrically connected to a circuit conditioner that is configured to selectively condition electrical current flowing through the circuit assembly.

At step 484, the circuit conditioner is positioned along the circuit assembly between the circuit controller and the electrical load.

At step 486, the circuit controller controls activation and/or deactivation of the circuit conditioner in order to power the electrical load with either alternative AC power (when the circuit conditioner is activated) or AC power (when the circuit conditioner is deactivated).

At step 488, AC power from the circuit breaker is selectively conducted to the circuit controller with a first hot conductor.

At step 490, the circuit controller determines whether or not the current and/or voltage through the first hot conductor is at or above a predetermined threshold level. This predetermined threshold level can be at a default setting embedded in firmware or software of the central processing unit, or the threshold level can be modified and/or set by the user as needed.

At step 492, if the current and/or voltage through the first hot conductor is at or above the predetermined threshold level, AC power from the circuit controller is conducted to the electrical load with a second hot conductor. In other words, as long as the circuit controller determines that at least the predetermined threshold level of current and/or voltage is detected through the first hot conductor, AC power will flow from the circuit controller to the electrical load via the second hot conductor.

At step 494, if the current and/or voltage through the first hot conductor is below the predetermined threshold level, alternative AC power from the circuit conditioner is conducted to the circuit controller, and then alternative AC power from the circuit controller is conducted to the electrical load with the second hot conductor. In other words, if the circuit controller detects that a level of current and/or voltage through the first hot conductor is below the predetermined threshold level of current and/or voltage, the circuit controller will activate the circuit conditioner, and alternative AC power will be used to power the electrical load. With this design, steps 490 and 492 are alternate steps such that only step 492 or step 494 can occur at one time. Stated another way, steps 492 and 494 cannot occur simultaneously.

At step 496, electrical power usage data is stored in a memory storage of a central processing unit of the circuit controller. Alternatively, the central processing unit can be located remotely from the circuit controller.

With the designs provided herein, in the event of a brown out, black out, or other types of limited or widespread power outages, the UPS can basically seamlessly power the electrical load on the specific circuit assembly to which it is connected, with an interruption time on the order of milliseconds or less. It is recognized that although the electrical power restoration system 220, 320, illustrated and described herein is particularly suited toward residential housing, it can likewise and similarly be adapted for commercial buildings, multi-family structures and other dwellings.

It is understood that although a number of different embodiments of the electrical power restoration system 220, 320, have been illustrated and described herein, one or more features of any one embodiment can be combined with one or more features of one or more of the other embodiments, provided that such combination satisfies the intent of the present invention.

While a number of exemplary aspects and embodiments of the electrical power restoration system 220, 320, have been shown and disclosed herein above, those of skill in the art will recognize certain modifications, permutations, additions and sub-combinations thereof. It is therefore intended that the system and method shall be interpreted to include all such modifications, permutations, additions and sub-combinations as are within their true spirit and scope, and no limitations are intended to the details of construction or design herein shown.

What is claimed is:

1. An electrical power restoration system for a circuit assembly having a circuit breaker, an electrical load and a circuit conditioner, the circuit conditioner being configured to condition electrical current flowing through the circuit assembly, the electrical power restoration system comprising:
    a circuit controller that is positioned along the circuit assembly between the circuit breaker and the electrical load, the circuit controller being electrically connected to the circuit conditioner, the circuit controller selectively controlling activation of the circuit conditioner;
    a first hot conductor that selectively conducts AC power from the circuit breaker to the circuit controller; and
    a second hot conductor that conducts AC power from the circuit controller to the electrical load only when the first hot conductor conducts AC power from the circuit breaker to the circuit controller.

2. The electrical power restoration system of claim 1, wherein the circuit conditioner is positioned along the circuit assembly between the circuit controller and the electrical load.

3. The electrical power restoration system of claim 1, wherein the circuit conditioner includes an uninterruptible power supply that selectively provides alternative AC power to the electrical load.

4. The electrical power restoration system of claim 1 wherein the circuit controller selectively powers the circuit conditioner via the first hot conductor.

5. The electrical power restoration system of claim 1 wherein at least a portion of the first hot conductor and a portion of the second hot conductor are each included as part of one at least partially sheathed, insulated electrical cable.

6. The electrical power restoration system of claim 1 wherein the first hot conductor and the second hot conductor are electrically isolated from one another.

7. The electrical power restoration system of claim 1, wherein the circuit controller includes a central processing unit having a memory storage that stores usage data of at least a portion of the electrical power restoration system.

8. The electrical power restoration system of claim 1 further comprising a low-voltage component, wherein the circuit controller includes a transformer for transforming 120V AC power to approximately 5V DC power, the transformer powering the low-voltage component.

9. The electrical power restoration system of claim 1, wherein the circuit controller includes a current usage monitor that monitors a current passing along one of the first hot conductor and the second hot conductor.

10. The electrical power restoration system of claim 1, wherein the circuit controller selectively controls deactivation of the circuit conditioner.

11. A method for restoring electrical power to an electrical load, the method comprising the steps of:
    positioning a circuit controller along a circuit assembly between a circuit breaker and the electrical load;
    electrically connecting the circuit controller to a circuit conditioner that is configured to selectively condition electrical current flowing through the circuit assembly;
    controlling activation of the circuit conditioner with the circuit controller;
    selectively conducting AC power from the circuit breaker to the circuit controller with a first hot conductor; and
    conducting AC power from the circuit controller to the electrical load with a second hot conductor only when the first hot conductor conducts AC power from the circuit breaker to the circuit controller.

12. The method of claim 11 wherein the step of electrically connecting includes positioning the circuit conditioner along the circuit assembly between the circuit controller and the electrical load.

13. The method of claim 11 wherein the circuit conditioner includes an uninterruptible power supply that selectively provides alternative AC power to the electrical load.

14. The method of claim 11 further comprising the step of storing electrical power usage data in a memory storage of a central processing unit of the circuit controller.

15. An electrical power restoration system for a circuit assembly having a circuit breaker and an electrical load, the electrical power restoration system comprising:
    a circuit conditioner that conditions electrical current flowing through the circuit assembly;
    a circuit controller that is positioned along the circuit assembly between the circuit breaker and the electrical load, the circuit controller selectively controlling activation of the circuit conditioner;
a first hot conductor that selectively conducts AC power from the circuit breaker to the circuit controller; and
a second hot conductor that conducts AC power from the circuit controller to the electrical load only when the first hot conductor conducts AC power above a predetermined threshold level from the circuit breaker to the circuit controller.

16. The electrical power restoration system of claim 15, wherein the second hot conductor conducts alternative AC power from the circuit controller to the electrical load only when the first hot conductor does not conduct AC power above the predetermined threshold level from the circuit breaker to the circuit controller.

17. An electrical power restoration system for a circuit assembly having a circuit breaker, an electrical load and a circuit conditioner, the circuit conditioner being configured to condition electrical current flowing through the circuit assembly, the electrical power restoration system comprising:
a circuit controller that is positioned along the circuit assembly between the circuit breaker and the electrical load, the circuit controller being electrically connected to the circuit conditioner, the circuit controller selectively controlling activation of the circuit conditioner;
a first hot conductor that selectively conducts AC power from the circuit breaker to the circuit controller; and
a second hot conductor that conducts alternative AC power from the circuit controller to the electrical load only when the first hot conductor does not conduct AC power from the circuit breaker to the circuit controller.

18. The electrical power restoration system of claim 17 wherein the alternative AC power is provided by the circuit conditioner.

19. The electrical power restoration system of claim 17 wherein the circuit controller selectively powers the circuit conditioner via the first hot conductor.

20. The electrical power restoration system of claim 17 wherein at least a portion of the first hot conductor and a portion of the second hot conductor are each included as part of one at least partially sheathed, insulated electrical cable.

21. A method for restoring electrical power to an electrical load, the method comprising the steps of:
positioning a circuit controller along a circuit assembly between a circuit breaker and the electrical load;
electrically connecting the circuit controller to a circuit conditioner that is configured to selectively condition electrical current flowing through the circuit assembly;
controlling activation of the circuit conditioner with the circuit controller;
selectively conducting AC power from the circuit breaker to the circuit controller with a first hot conductor; and
conducting alternative AC power from the circuit controller to the electrical load with a second hot conductor only when the first hot conductor does not conduct AC power from the circuit breaker to the circuit controller.

* * * * *